Aug. 16, 1932.  J. WEINSTEIN  1,871,829
REFRIGERATORY CONTAINER
Original Filed June 22, 1927
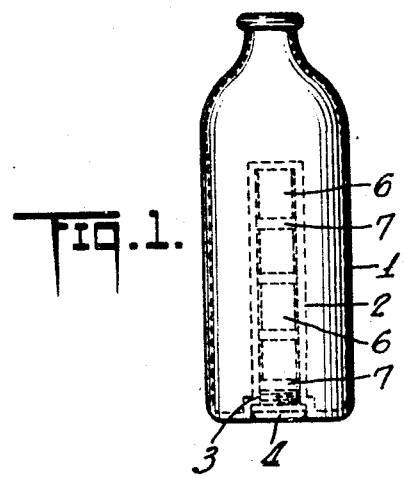
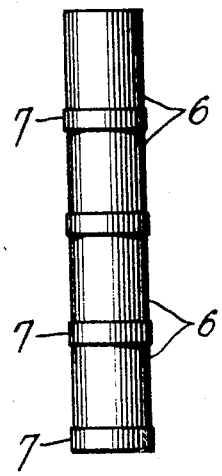
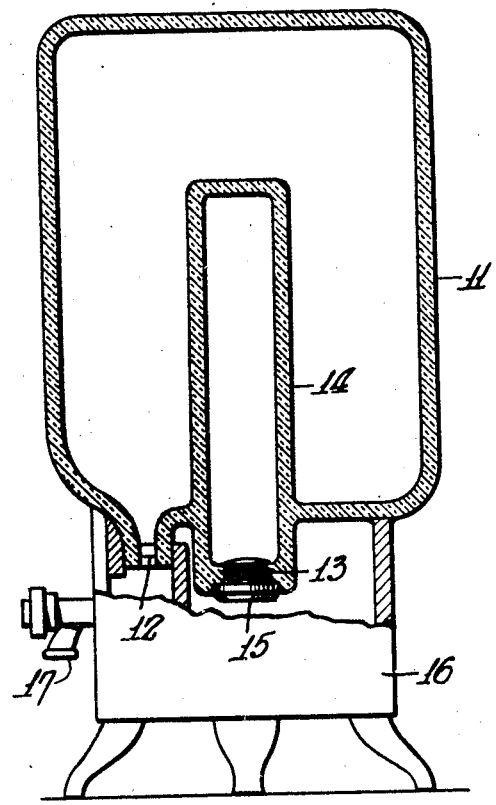
INVENTOR
Joseph Weinstein
BY
George C. Dean
ATTORNEY Patented Aug. 16, 1932

1,871,829

UNITED STATES PATENT OFFICE

JOSEPH WEINSTEIN, OF BROOKLYN, NEW YORK, ASSIGNOR TO DRYICE EQUIPMENT CORPORATION, OF NEW YORK, N. Y., A CORPORATION OF DELAWARE

REFRIGERATORY CONTAINER

Original application filed June 22, 1927, Serial No. 200,515. Divided and this application filed March 21, 1930. Serial No. 437,789.

This invention comprises subject matter set forth in my co-pending application Ser. No. 200,515, filed June 22, 1927, of which this application is a division.

The specific devices shown are two forms of containers for materials to be refrigerated, both primarily adapted for liquids, but the novel features of the invention may be practised in connection with other materials. The preferred refrigerant herein selected is solid carbon dioxide.

An important feature of the invention is having the refrigerant physically within and surrounded by the products to be refrigerated, yet completely cut off from all possibility of mingling of gas from the solid carbon dioxide with the product to be refrigerated. I have discovered that when so located, and particularly in connection with liquids, great economies in the use of the refrigerant may be effected. One important contributing factor is the use of cartridges or containers filled with the solid carbon dioxide and constructed so as to fit within the refrigerant containing element of the device while yet separated and insulated therefrom.

The above and other features of my invention will be more fully understood from the following description in connection with the accompanying drawing, in which Fig. 1 is a side view of a bottle constructed in accordance with this invention;

Fig. 2 is a vertical section of the invention as applied to a water cooler; and

Fig. 3 is a side elevation of the refrigerant cartridges.

In Fig. 1 the refrigerating apparatus is shown in the form of a bottle 1, for milk or other liquid, provided with a central chamber 2 having a plugable entrance 3. In the present case, the plug 4 is shown as screw threaded. The bottle may be covered with an unbreakable cage to protect the glass or similar fragile material from which bottles are customarily made. The central chamber 2 extends upwardly from the bottom, being integral therewith, and the solid carbon dioxide, preferably in cartridge form, may be inserted through the entrance 3, and retained in chamber 2 by replacing plug 4.

With the preferred refrigerant, solid carbon dioxide, the gas sublimating therefrom may be vented in any of the usual ways as by leaking around or through the plug or through any other vent that may be provided for the purpose. Thus arranged, the solid carbon dioxide is located in and substantially surrounded by the space to be refrigerated, in intimate heat transfer relation thereto, yet separated therefrom by a water-tight, gas-tight, impervious wall.

As will be evident from Fig. 2 hereof and from the other forms shown in my said prior application, the refrigerant container 2 as well as the exterior enclosing container may be varied widely as to size, proportions and specific details of construction. A bottle like that shown in Fig. 1 is adaptable for a baby's milk bottle, in which case the refrigerant will of course be removed and the bottle warmed in the usual ways before using.

In the water cooler shown in Fig. 2 the entrances to both the refrigerant container and the refrigerator chamber are in the same end of the unit. This form is particularly adaptable in the larger refrigeratory containers, especially those of the water bottle type. The bottle 11 has the opening 12 for the water and the central opening 13 for the axially extending refrigerant container 14 which may be charged with the refrigerant in cartridge or other form. The entrance 13 to the refrigerant container 14 is closed, as by a plug 15, which may have leaks or a vent for escape of the gas, as in the case of Fig. 1. In use, the bottle is inverted on supporting stand 16, equipped with a faucet 17 which is supplied with water through opening 12, from container 11.

Obviously, the proportions of the refrigerant container and the liquid container may be varied to suit different conditions of use and the solid carbon dioxide may be employed in any desired form, but there are certain advantages in having the special cartridges hereinafter described.

The cartridges for the solid carbon dioxide are separately claimed in my application Ser. No. 437,788 of even date herewith, but they are of special importance in combination with refrigerant containers located in direct heat transfer relation with freezable liquids or other products likely to cause damage or to be damaged by over-refrigeration.

Referring to Fig. 3, the container 6 for the solid carbon dioxide is ordinarily made of any suitable heat insulating material and may be open or closed at one or both ends.

An encircling member 7, is provided around the outer circumference of one end of each container 6, projecting beyond the end thereof sufficiently to telescope over the end of another similarly constructed container. This permits of securing a plurality of such cartridges in one unit and at the same time allows for very quick and convenient separation of the unit or any part of it.

As stated in my said parent application, these cartridges, particularly when filled with solid carbon dioxide or the like, are preferably made of such size as to fit within the various chambers in which they are to be used as the refrigerant. Obviously, it is only the outer circumference of the projecting rings 7 that can thus fit said containers and this is of advantage because it affords a relatively small area of direct conducting contact, most of the cartridge being spaced away from the chamber wall and, in use, the space is necessarily filled with the evaporated carbon dioxide gas, which is a remarkably effective non-conductor of heat. This has the obvious advantage of preventing too rapid sublimation of the solid carbon dioxide, thereby avoiding waste of the refrigerant while at the same time avoiding over-refrigeration of the liquid or other material which is to be cooled thereby.

The refrigerants act to keep the contents of the bottles cold and natural circulation of the liquid will tend to prevent over-refrigeration thereof. The various plugs may be cork lined, and may be of the screw type.

I claim:

1. A bottle provided with an inwardly projecting water-eight, gas-tight chamber having an independent plugable opening to the exterior through which it may be charged with refrigerant and through which gas may escape, in combination with solid carbon dioxide in said chamber, and means for preventing contact of said solid with the walls of said container.

2. A bottle provided with an inwardly projecting water-tight, gas-tight chamber having an independent plugable opening to the exterior through which it may be charged with refrigerant and through which gas may escape and, within said chamber, one or more cartridges each comprising a container enclosing solid carbon dioxide.

3. A bottle provided with an inwardly projecting water-tight, gas-tight chamber having an independent plugable opening to the exterior through which it may be charged with refrigerant and through which gas may escape and, within said chamber, one or more cartridges each comprising a container enclosing solid carbon dioxide, the latter having an annular member of larger diameter than the body portion.

4. A bottle provided with an inwardly projecting water-tight, gas-tight chamber having an independent plugable opening to the exterior through which it may be charged with refrigerant and through which gas may escape and, within said chamber, one or more cartridges each comprising a container enclosing solid carbon dioxide, the latter having an annular member of larger diameter than the body portion of size suitable to fit said refrigerant chamber.

5. A bottle provided with an inwardly projecting, water-tight, gas-tight chamber having an independent plugable opening to the exterior through which it may be charged with refrigerant and through which gas may escape and, within said chamber, one or more cartridges, each comprising solid carbon dioxide in a container, and a strip or ring around the outer circumference of the container, whereby the body of the container will be prevented from contact with the walls of said refrigerant container.

6. A bottle provided with an inwardly projecting water-tight, gas-tight chamber having an independent plugable opening to the exterior through which it may be charged with refrigerant and through which gas may escape and, within said chamber, a plurality of solid carbon dioxide cartridges each consisting of solid carbon dioxide in a container, one end of each container being detachably engaged with one end of another similar sized cartridge.

7. The combination specified by claim 6 and in which the cartridges fit the interior of the refrigerant container.

8. A water-tight, gas-tight container of liquid enclosing a spaced to be refrigerated and having secured gas-tight and water-tight to a wall thereof, an inwardly projecting water-tight, gas-tight chamber having direct conducting contact with the liquid, having an independent plugable opening to the exterior through which it may be charged with refrigerant and through which gas may escape, in combination with solid carbon dioxide in said chamber, and means for preventing contact of said solid with the walls of said container.

9. A water-tight, gas-tight container of liquid enclosing a space to be refrigerated and having secured gas-tight and water-tight to a wall thereof, an inwardly projecting water-tight, gas-tight chamber having direct conducting contact with the liquid, having an independent plugable opening to the exterior through which it may be charged with refrigerant and through which gas may escape and, within said chamber, one or more cartridges each comprising a container enclosing solid carbon dioxide.

10. A water-tight, gas-tight container of liquid enclosing a space to be refrigerated and having secured gas-tight and water-tight to a wall thereof, an inwardly projecting water-tight, gas-tight chamber having direct conducting contact with the liquid, having an independent plugable opening to the exterior through which it may be charged with refrigerant and through which gas may escape and, within said chamber, one or more cartridges each comprising a container enclosing solid carbon dioxide the latter having an annular member of larger diameter than the body portion.

11. A water-tight, gas-tight container of liquid enclosing a space to be refrigerated and having secured gas-tight and water-tight to a wall thereof, an inwardly projecting water-tight, gas-tight chamber having direct conducting contact with the liquid, having an independent plugable opening to the exterior through which it may be charged with refrigerant and through which gas may escape and, within said chamber, one or more cartridges each comprising a container enclosing solid carbon dioxide, the latter having an annular member of larger diameter than the body portion of size suitable to fit said refrigerant chamber.

12. A water-tight, gas-tight container of liquid enclosing a space to be refrigerated and having secured gas-tight and water-tight to a wall thereof, an inwardly projecting water-tight, gas-tight chamber having direct conducting contact with the liquid, having an independent plugable opening to the exterior through which it may be charged with refrigerant and through which gas may escape and, within said chamber, one or more cartridges, each comprising solid carbon dioxide in a container, and a strip or ring around the outer circumference of the container, whereby the body of the container will be prevented from contact with the walls of said refrigerant container.

13. A water-tight, gas-tight container of liquid enclosing a space to be refrigerated and having secured gas-tight and water-tight to a wall thereof, an inwardly projecting water-tight, gas-tight chamber having direct conducting contact with the liquid, having an independent plugable opening to the exterior through which it may be charged with refrigerant and through which gas may escape, and, within said chamber, a plurality of solid carbon dioxide cartridges, one end of each cartridge being detachably engaged with one end of another similar sized cartridge.

14. A water-tight, gas-tight container of liquid enclosing a space to be refrigerated and having secured gas-tight and water-tight to a wall thereof, an inwardly projecting water-tight, gas-tight chamber having direct conducting contact with the liquid, having an independent plugable opening to the exterior through which it may be charged with refrigerant and through which gas may escape, and solid carbon dioxide containers fitting the interior of the refrigerant container.

15. A water-tight, gas-tight container of liquid enclosing a space to be refrigerated and having secured gas-tight and water-tight to a wall thereof, an inwardly projecting water-tight, gas-tight chamber having direct conducting contact with the liquid, having an independent plugable opening to the exterior through which it may be charged with refrigerant and through which gas may escape, and solid carbon dioxide within said chamber but insulated from the walls thereof.

Signed at New York, in the county of New York and State of New York, this 20th day of March, A. D., 1930.

JOSEPH WEINSTEIN.